United States Patent [19]

Lee et al.

[11] Patent Number: 4,699,047
[45] Date of Patent: Oct. 13, 1987

[54] PASTE SPREADER APPARATUS FOR SHREDDED WHEAT

[75] Inventors: Ralph D. Lee, Hackettstown; Nicholas R. Polifroni, Cliffside Park, both of N.J.

[73] Assignee: Nabisco Brands, Inc., Parsippany, N.J.

[21] Appl. No.: 695,060

[22] Filed: Jan. 25, 1985

[51] Int. Cl.[4] .................. A22C 7/00; A23G 1/20; A23P 1/00

[52] U.S. Cl. .................. 99/450.2; 99/450.1; 239/566; 425/131.1; 425/376 R

[58] Field of Search .......... 425/463, 462, 464, 376 R, 425/131.1; 239/566, 567, 587; 99/450.1, 450.2, 450.4, 450.7, 450.8, 352, 353, 483, 487, 516, 534, 646 R; 118/13, 16, 24

[56] References Cited

U.S. PATENT DOCUMENTS

| 502,378 | 8/1893 | Perky et al. | |
|---|---|---|---|
| 1,384,601 | 7/1921 | Costello | 425/463 |
| 2,008,024 | 7/1935 | Loose | |
| 2,013,003 | 9/1935 | Loose | |
| 2,129,681 | 9/1938 | Geibig | 239/566 |
| 2,998,934 | 9/1961 | Broughton | 239/566 |
| 3,724,984 | 4/1973 | Jernigan | 425/131.1 |
| 3,767,338 | 10/1973 | Soderlund et al. | 425/131.1 |
| 3,878,992 | 4/1975 | MacManus | 425/463 X |
| 4,004,035 | 1/1977 | Hirzel et al. | 99/450.2 |
| 4,102,625 | 7/1978 | Luthi et al. | 425/464 |
| 4,207,281 | 6/1980 | Bernard | 99/483 X |

FOREIGN PATENT DOCUMENTS

| 674046 | 4/1967 | Canada . |
| 2125881 | 9/1970 | Fed. Rep. of Germany . |
| 6777721 | 8/1952 | United Kingdom . |

*Primary Examiner*—Timothy F. Simone
*Attorney, Agent, or Firm*—Richard Kornutik

[57] ABSTRACT

Edible paste enters an apparatus at an inlet. A nut holds the inlet coupled to another supply pipe. A portion of the nut is threaded. The area of the inlet is approximately equal to the area of a slit-like opening, the filling material or edible paste passing through the slit and into an opening in a block. A second block has a plurality of valves therein, the valves being simple plug valves, and having a single bore therethrough. Paste is extruded through nozzles fixedly connected to a third block, and paste is extruded into rows upon a moving bed of a lower half portion of a continuous sheet of "shredded wheat" in its uncut form. The paste is laid in rows of five across, and a second sheet of uncut shredded wheat is laid atop the first layer, trapping the rows of paste. The resulting product when cut forms the familiar shredded wheat biscuit shape. The finished product contains raisin paste.

15 Claims, 19 Drawing Figures

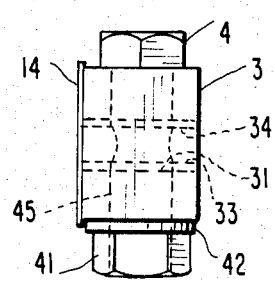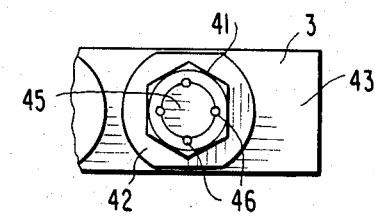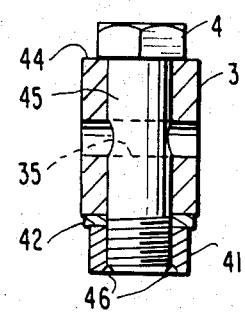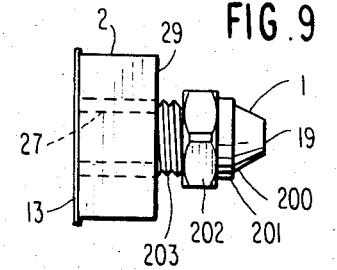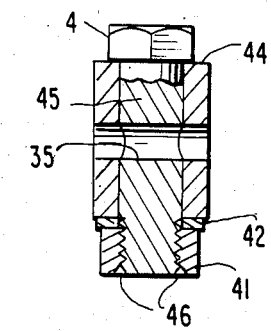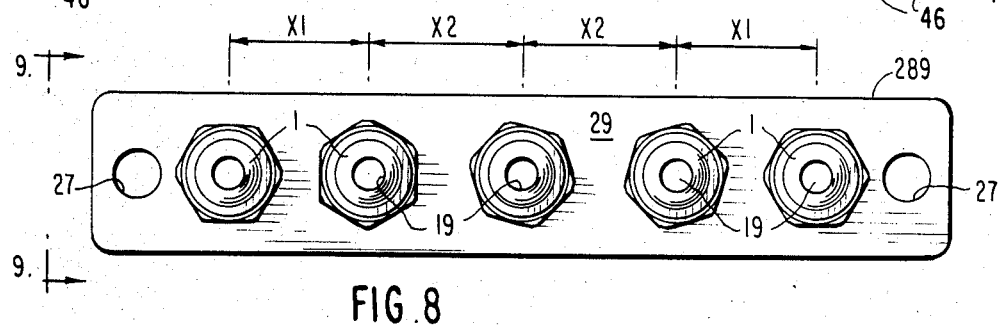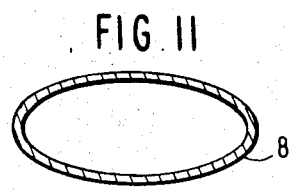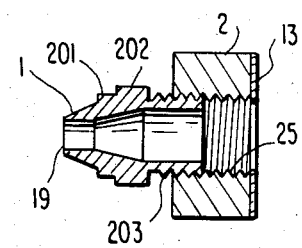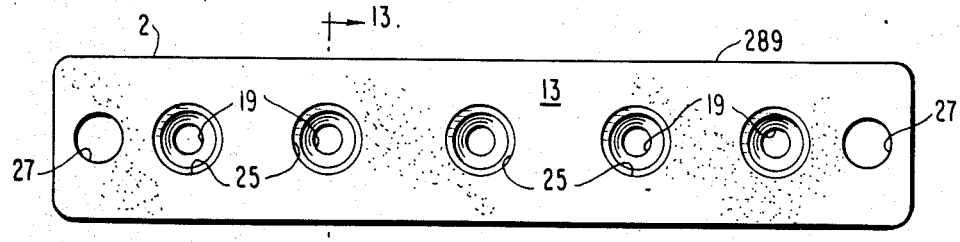

PASTE SPREADER APPARATUS FOR SHREDDED WHEAT

BACKGROUND OF THE INVENTION

This invention relates to shredded wheat biscuits, and in particular to shredded wheat biscuits havings an edible paste therein. The invention particularly relates to a paste spreader apparatus for locating edible paste on a bed of shredded wheat, atop which bed the edible paste is located, and atop which a second and final composite layer of shredded wheat is added prior to biscuit-forming steps including cutting of the layers into individual biscuits. The bed layer and composite layer each are usually formed of four or five individual wheat layers composed of wheat strands, as is well-known in the shredded wheat biscuit art.

It is conventional to supply a fluid, paste, or other substance having fluid-like properties under pressure from a supply to a nozzle, and to control the flow through the nozzles by means of valves. Furthermore, it is another well-known concept in the art to equalize flow from a common supply through individual nozzles by individually adjusting valves associated with each individual nozzle.

It is a problem in the art, however, when a paste formed of organic commestible or other material, such as raisin paste, strawberry paste, banana paste, blueberry paste, apricot pastes, or apple paste, among others, to provide straight and uniform extrudate paths from each nozzle fed by a common supply. This phenomenon is not yet clearly understood, but believed to be due to either a time-varying turbulent pattern formed during fluid flow, or to a type or organic "memory" which exhibits itself as erratic behavior in the flow path component transverse to the axis of the nozzle. In particular, it is a problem to extrude paste from a common supply through a plurality of nozzles so that the paste lies in uniformly and precisely located straight rows or lines while being deposited upon a moving bed, or while the nozzles move relative to a stationary bed or support. The moving bed in the food industry in usually supported by a conveyor belt or the like, with the nozzles being stationary over the moving bed. The moving bed atop the conveyor belt can be a bed of shredded wheat layers, usually four layers thick, which forms the lower half of what ultimately becomes a whole shredded-wheat biscuit.

It is also a problem in the art that, when several nozzles are supplied by a single header or supply, directionality of the paste extruded through the nozzles is not always dependent entirely upon the nozzle axis. Thus, conventional gate-type valves which are in common use cannot alter the flow path or pattern of extrudate from a nozzle, especially when such extrudate does not continuously flow in a direction colinear with the axis of the nozzle, as in the situation with pastes discussed above. This holds true despite attempts at perfecting nozzle design so that the nozzles have sharp outlet edges to prevent end effects of the nozzles from disturbing the paste flow.

It is therefore a problem in the art to provide a plurality of nozzles, supplied by a single supply source, which can precisely and consistently distribute paste extruded from the plurality of nozzles by using adjustable members or means, which can both control flow through individual nozzles as well as affect the direction of paste extruded through each of the nozzles, without re-locating, moving, or disturbing the nozzles themselves in any way. Thus a transverse component of flow to a nozzle axis has not been solved in the prior art by controlling a valve upstream of the nozzle. Many grains require different cooking times, different tempering times and different temperatures to obtain optimal flowability properties, shred strength, appearance, and the like. Accordingly, to produce a cereal product having a mixture of different types of cereal grains in each biscuit, it is preferable to separately process each type of grain and to then co-shred the grains. It is also possible to combine the separate grains by separately shredding the grains and then layering the shreds of different grains.

SUMMARY OF THE INVENTION

It is accordingly one object of the present invention to provide an improved apparatus for distributing paste which is relatively simple in construction, formed of readily available materials, and that can be manufactured by persons of ordinary skill in the food processing equipment arts.

Another object of the invention is provide an improved apparatus for distributing paste, wherein a plurality of nozzles are provided, which are supplied by a single source, with the flow through each of the nozzles being separately controllable so that each nozzle extrudes a constant, predetermined amount of paste, each nozzle being controllable to distribute an identical amount of paste to each of the other nozzles which are supplied from the common source.

A further object of the present invention is to provide an improved apparatus for distributing commestible paste onto a moving substrate, including a plurality of nozzles supplied by a common supply with a means for controlling directionality of the extrudate material from each of the nozzles, without the necessity of moving or relocating any of the nozzles themselves.

A still further object of the present invention is to provide an improved apparatus for applying paste in uniform rows to a moving substrate, including a paste supply, a plurality of nozzles supplied from the paste supply, and a single means associated with and upstream of each nozzle for controlling both the amount of flow through each nozzle as well as the directionality of flow through each of the nozzles, without the necessity of movement or disturbance of any of the nozzles.

Shredded wheat biscuits are well-known in the prior art. Also, apparatus for forming shredded wheat biscuits are well-known in the prior art, as evidenced by the U.S. classification system and the index to the U.S., classification system, which specifically refers to shredded wheat biscuits and to apparatus for forming shredded wheat biscuits.

The process of the present invention, including the apparatus for spreading paste, precisely locates raisin or apple paste, or other commestible pastes discussed in the above, along continuous straight lines on a continuously moving bed of shredded wheat, the continuously moving bed being then sliced and pinched to form individual shredded wheat biscuits. The pinched biscuits are then toasted in an oven, and the biscuits separated as by breaking at the pinched locations. Each individual biscuit so formed preferably has very little or no paste visible along any of the edges thereof, except possibly a small or minute amount along at most two of the pinched edges of the biscuit. No paste should be visible at either of the two edges of the biscuit which are parallel to the paste rows. The biscutis may if desired have a single open, edge being the extreme edges of the bed which is not pinched because separation from other biscuits is unnecessary.

Knowledge of the prior art methods of forming shredded wheat biscuits is very helpful in understanding the resulting product of the present invention. Such devices and systems are well-known in the prior art, as evidenced by the following discussion.

Shredding systems which can be used in the process of the present invention may comprise conventional rolls and devices such as those indicated in U.S. Pat. Nos. 502,378, 2,008,024, 2,013,003, 4,004,035 and Canadian Pat. No. 674,046. A conventional shredding mill for use in the process of the present invention comprises a pair of closely spaced rolls that rotate in opposite directions, with at least one of the rolls having circumferential grooves. Upon passing between the rolls, the wheat is deformed into long individual strings or shreds. The circumferentially grooved roll can also be grooved transversely to the circumferential grooves for the production of the net-like sheets. When the rollers are held to roll in mutual contact, the shreds or filaments will be fairly separate from each other, though more or less contacting, but when the rollers are sprung slightly apart, under pressure, the adjacent filaments may be united to each other by very thin translucent, almost transparent, webs or fins between them.

The shredding mills are typically arranged in a linear series along a common conveyor, with the shreds running longitudinally or in parallel with the direction of movement of the conveyor. The sheets or layers of filaments are deposited on the conveyor in super-position, with their filaments running in the same direction. A typical biscuit, for example, may contain from 2 to 20 individual layers of shreds, with 8 total layers being the most usual. Upon obtaining the requisite or desired thickness, the multiple layer shredded wheat bed can be cut transversely and longitudinally into multiple lines of biscuits in known manner. The cutting can be completely through the laminate to form the individual bisbuit shapes prior to baking. Cutting partially through the laminate to form biscuit shapes, followed by baking, and separating the baked partially cut laminate into individual biscuits in known manner is preferred for easier control of the orientation of the cut product as it passes through the baking oven.

Suitable ovens for drying, baking and toasting the shredded product include Proctor & Schwartz, Werner Lahara and Spooner ovens containing forced air and has fired burners and a conveyor.

In the present invention, an extruder has a coupling member for cupling to a pipe of the like which contains raisin paste, apple paste, or the like. Preferrably, an Acme threaded sanitary tubing fitting is used, or a clamp type such as a Triclover Tri-clamp, among others. The paste is forced through a conduit to a formed slit-like member, the slit-like member having an area which is approximately equal to the area of the inlet conduit, in the preferred embodiment.

This slit-like member is formed in a solid block which is rigidly connected thereto by welding or the like, and which is fastened to a block-like member having individually adjustable plug valves. Each plug valve has a cylindrical body and a head, the cylindrical body having a bore therethrough. In order to control flow through each of the bores, the head may be turned in either direction from dead center. A third block-like member has nozzle fixedly attached thereto, in line with the bores formed in the second block-like member.

Therefore, the slit-member supplies, through holes formed in the second block-like member, the bores in each of the plug valves. The plug valves control both the amount and the general direction of paste flow through the nozzles downstream of the plug valves.

Gaskets are interposed inbetween the separate block-like members, the block-like members being connected together by bolts, welding, or any other suitable means, including clamps or the like. The nozzles are generally tapped or threaded into the third block-like member so that the length of each nozzle from the third block-like member is controllable by rotation of the individual nozzle. Teflon ® tape (not shown) is used on the indivudual threaded nozzle fittings to prevent leakage. Each individual nozzle tapers from a relatively large area to a narrower or more constricted area. This results in a directed flow, the flow not always occurring directly linear along the axis of the individual nozzle, but rather the flow may have a component of motion transversely directed to the axis of any particular individual nozzle. This is due, as discussed above, either to complex turbulent flow patterns, or a form of fluid material "memory" which affects the flow. In this event, turning of the plug valve, or other valve having an equivalent bore therethrough, associated with the individual nozzle, results in both a restriction in the flow to the nozzle as well as a change in the direction of the transverse component of flow. Since the preferred plug valve can control or restrict flow by turning in either a clockwise or a counterclockwise direction, the directionality of the transverse component of flow may be controlled by rotation in a suitable direction of the plug valve head. A line inscribed on the head indicates the direction of the bore axis therethrough.

Each of the plug valves is retained at a projecting end of the plug valve which is fixedly connected to a nut member to prevent movement of the plug valve along the bore in the block-like member in which the plug valve is seated.

The paste extruder, once properly aligned and the flow controlled so that each nozzle produces a uniform flow of paste in a desired direction, then deposits the paste extrudate in a continuous stream upon a moving bed of shredded wheat which is to be subsequently formed into biscuits. The paste is generally deposited as nearly as possible to the center line of what will eventually become an individual shredded wheat biscuit. As the shredded wheat bed, having the continuous rows of paste thereon, then passes to a station where an upper layer, preferrably having four or five layers of shredded wheat therein, is layed atop the lower bed of shredded wheat, thereby completely covering the paste extrudate. Brown sugar is then preferably added atop the lower bed. The entire shredded wheat assembly described above is then conveyed to a station where individual rows and columns of biscuits are formed by pinching of the shredded wheat assembly. The shredded wheat biscuit assembly is preferably toasted before being broken apart. The extrudate rows are enclosed within each biscuit and lie generally intermediate sides of each biscuit.

Further details and advantages of the present invention appear from the following description of a preferred embodiment shown schematically in the drawings.

BRIEF DESCRIPTION OF THE DRAWINGS

FIG. 4 is a side elevational view of a second block-like member showing the heads of the plug valve members, nuts holding the plug valve members, as well as dotted outlines showing the relationship of the plug valve bodies as well as the bores through the second block-like member;

FIG. 6 is a bottom elevational view of the second block-like member shown in FIG. 4, partially broken away to show only a single nut member;

FIG. 7 is a side elevational view of a plug, showing the nut in section, and the bore in dotted outline;

FIG. 8 is front elevational view of a third block-like member along the nozzle side where paste exits;

FIG. 9 is side elevational view of the block-like member of FIG. 8, showing the shape of the nozzles and in dotted outline the threaded bore through the third block-like member, FIG. 9 being taken along line 9—9 of FIG. 8;

FIG. 10 is a view taken in section along line 10—10 of FIG. 5, to show the bore through the plug valve member alinged with the bore in the block-like member to permit full fluid flow therethrough, showing the nut portion in section, and showing the head of the plug valve body in perspective view;

FIG. 11 is a sectional view taken along line 11—11 of FIG. 2, showing the shape of a central portion of the body which connects the slit-like member to the generally circular supply cylinder portion;

FIG. 12 is a rear elevational view of the third block-like member of the present invention, showing the constriction of the nozzle through bores formed through the third block-like member;

FIG. 13 is a side sectional view taken along line 13—13 of FIG. 12, showing the cross-section of a nozzle including the interior shape thereof and the threading in the bore which holds the nozzle;

DETAILED DESCRIPTION OF THE INVENTION

Figure 1:
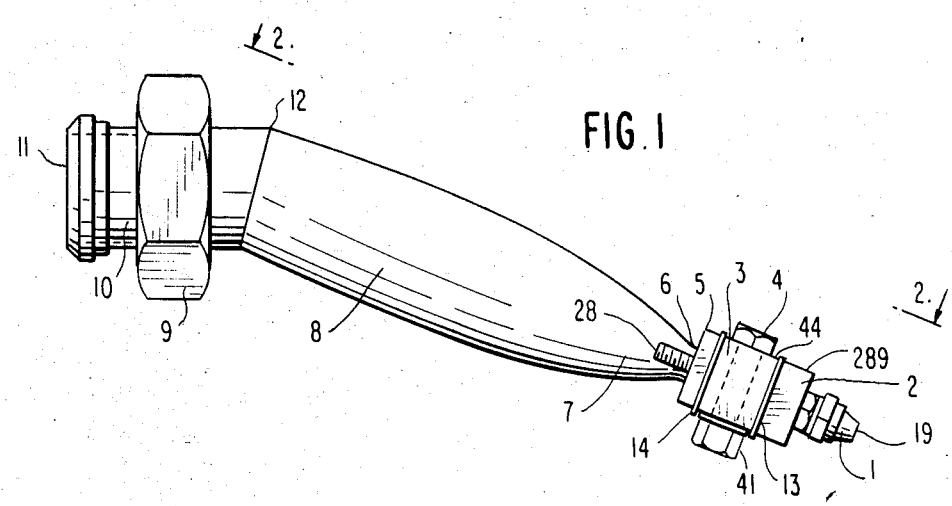
FIG. 1 is a side elevational view of the paste spreader apparatus of the present invention as it would be oriented during operation.

FIG. 1 is a side elevational view of the apparatus of the present invention. The apparatus is used to extrude paste, such as raisin paste, strawberry paste, banana paste, blueberry paste, apricot paste, or apple paste, through nozzles so as to precisely direct a controlled amount of paste from each nozzle onto a substrate such as a bed of shredded wheat, or other substrate. The apparatus includes an inlet orifice 11 and an outlet orifice 19, the outlet orifice 19 being seen in FIG. 1 as a nozzle 19.

A nut 9 is slidable along conduit 10, and has an internal structure (not shown in FIG. 1) to enable it to aut one or more of the ledges shown in FIG. 1 (unnumbered) so that an internal threaded portion of the nut 9 projects beyond the inlet orifice 11. Preferrably, an Acme threaded sanitary tubing fitting is used, or a clamp type such as a Triclover Tri-clamp, among others. This enables coupling of the nut 9 and the inlet orifice 11 to a conventionally threaded pipe member. A weld 12 joins the generally cylindrical, hollow conduit 10 to a somewhat flatened member 8.

The somewhat flattened member 8 is fixedly connected to a first block-like member 5 along a joint 6, which may be a welded joint, a machined joint, or the like, so as to be consistent with the detailed construction shown in FIG. 3 and discussed in the following.

The member 8 has a generally circular cross-sectional shape and is hollow at the junction 12 which is preferrably a welded junction, although this entire construction could also be molded of a moldable material such as metal, plastics, fiber-reinforced plastic material, or the like. The member 8 then has a gradually flattening cross-sectional shape so that at its end 6 it extends across a relatively wide length so as to supply a plurality of nozzles 19. The portion 7 of the member 8, which is near the joint 6, has an approximately slot-like cross-sectional shape which is hollow. In a preferred embodiment, the cross-sectional area of the inlet portion 11 is generally equal to the cross-sectional area of slot 6, which is shown in greater detail in FIG. 3.

As seen in FIG. 1, the nozzles 19 are directed somewhat downwardly due to the angle at which the joint 12 connects members 8 and 10. In operation, the nozzles are preferrably inclined at a 45° downward angle, although such angle can range from 0° to 90° if desired to apply the extrudate paste. A second block-like member 3 is connected to the first block-like member 5, having an intermediary gasket 14· therebetween to prevent leakage of paste between the adjacent block-like members 3 and 5. A valve head 4 is visible in elevational view in FIG. 1, as is a corresponding nut 41 along the bottom edge of the block-like member 3. A third block-like member 2 is seen in FIG. 1 connected to the second block-like member 3, having an intermediary gasket 13 therebetween to prevent fluid leakage between the adjacent blocks. All three block-like members, 2, 3, and 5 are connected together by headed fasteners 28. The headed fasteners 28 connect the blocks together as follows. The headed portion is on the outer-most surface of the block-like member 2 nearest the nozzle 19. The headed fastener 28 passes through bores in the block-like members 2 and 3 and fits in threaded engagement into a threaded hole 51 formed in the first block-like member 5.

Each of the nozzles 19 has a nut-like portion 1 and a threaded portion which threadingly engages corresponding threaded holes in the block-like member 2. Teflon ® tape (not shown) is used on the individual threaded nozzles fittings to prevent leakage. Thus, the length of projection of each of the nozzles 19 is adjustable merely by rotation of the nuts 1 to cause the nozzles 19 to move toward or away from the block-like member 2 along a central axis of the threaded bores 21 (seen in dotted outline in FIG. 1).

Also in FIG. 1, in dotted outline is seen the body of a plug valve 31 (unnumbered in FIG. 1). The plug valve body 31 is fixedly connected to, or is integral with, the head member 4. The nut 41 is fixedly connected with or made integral with the plug body 31. The second block-like member 3 has an upper surface 44 as seen in FIG. 1. The third block-like member 2 has an upper surface 289 as seen in FIG. 1.

Figure 2:
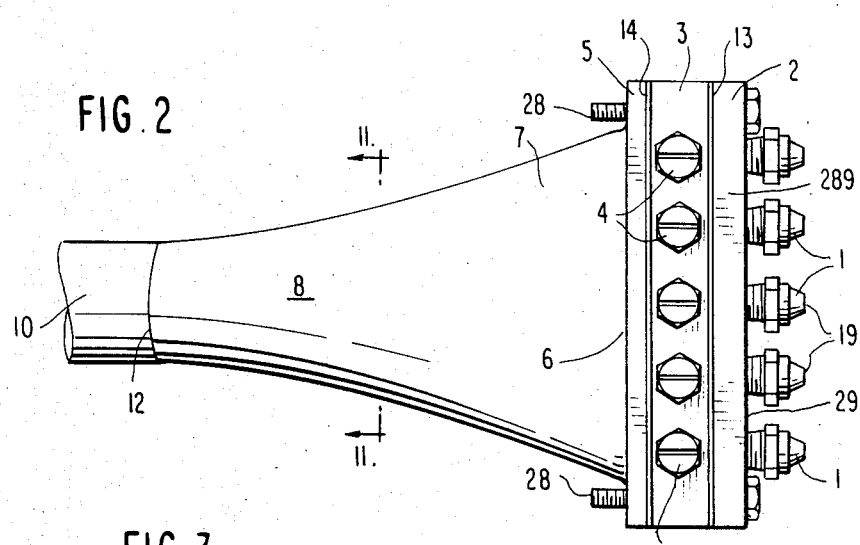
FIG. 2 is a top elevational view of the spreader apparatus shown in FIG. 1.

FIG. 2 is a top elevational view of the inventive apparatus as seen along the inclined view 2—2 of FIG. 1 which is generally parallel to the central axis of the headed member 28 and to the axes of the nozzles 19. This view shows the true elevational shape of the upper-most surfaces of each of the block-like members 2, 3, and 5.

FIG. 2 shows that there are five nozzles 19, and shows the true projecting length of each of the nozzles 19. The true view of the headed portions 4 of the valve members are seen in FIG. 2. Each headed portion 4 has a line formed therein, to indicate the positon of the valve, the lines being parallel to the axis of each bore 35 formed in the valve body 34. The problem of maintaining uniformed spacing between the paste extruded through the orifices 19 is solved partially by formation of a predetermined spacing between each of the nozzles 19. In particular, the two end nozzles, in FIG. 2 being the upper-most nozzle and the lower-most nozzle, are spaced apart by a distance of approximately 1 millimeter less than the spacing between the central nozzle and each adjacent nozzle, the preferred spacing between these nozzles approximately 25 millimeters apart from center line to center line. Although any predetermined spacing can be used, based upon the scale and relative sizes of the orifices 19 and other factors, it is noteworthy that for uniform row spacing it is sometimes necessary, as in this case, to have non-uniform nozzle spacing to maintain a constant extrudate row spacing. This is due to a number of factors, including the "end effects" of the nozzle and manifold assembly, as well as to an apparent inherent "memory effect" of the complex chemical constituents forming the edible paste which tends to prevent a straight and constant flow which might be expected based upon the shapes, orientations, and sizes of the nozzles themselves. Furthermore, such variations in extrudate spacing are due to the transverse components to the axis of the nozzles of the extrudate flow. Such transverse components are due to the above-mentioned effects, and also are due to the downstream turbulence effects which are present in all fluids which flow from one type of conduit to another. It is expected that, however, the flow of water or thin oil, for example, would be more predictable and would generally flow more co-linearly with the axis of each nozzle. Such effects occur downstream of any change in conduit conditions, and are often unpredictable and can even be violent. Such effects in general are well-known and are well-documented in the fluid mechanics arts.

The lower headed fastener 28 which connects the three block-like members 2, 3, and 5 together the upper fastener 29 retains the three block-like members together. Together, these two fasteners 28, 29 retain all three block-like members together. It is noted that the portion 7 of member 8 is fixedly attached to the block-like member 5 at the joint 6. This is shown in FIG. 3, discussed below. FIG. 2 is partially broken away just beyond the welded joint to the left of the figure. FIG. 2 shows how the member 8 spreads out from left to right until at portion 7 it becomes a relatively wide portion.

The member 8, having the deformed portions shown, can be formed generally from a conventional funnel or pipe stock which is heated and deformed smoothly and relatively continuously outwardly as shown in the figures so that one end maintains its generally circular cross-sectional shape, while the other end forms a generally elongated, slot-like cross-sectional shape. However, this member 8 can also be formed in other ways such as by molding in a pre-formed mold, blow molding from plastic, or use of any other forming methods and using any formable materials adequate for the purpose of extruding paste through the nozzles 19.

The right-hand portion 29 of the block-like member 2 is seen in FIG. 2. This surface is seen in true frontal elevational view in FIG. 8, also discussed below.

Figure 3:
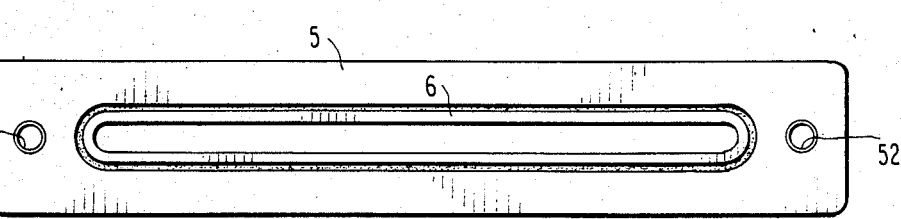
FIG. 3 is a front elevational view of the first block-like member containing an extruding slit.

FIG. 3 is a front elevational view of the block-like member 5 as seen as it would be taken from the right of FIG. 1, but in true view such as in FIG. 2. The block-like member 5 is seen in its dis-assembled form so that the interior surfaces of the threaded bores 52 are seen as being a circular outline in FIG. 3. Also, the slot 6 is shown as being welded to the block-like member 5, which has a planar surface. The surface 5 visible in FIG. 3 is the surface which is adjacent to the gasket 14 in FIG. 2. As seen in FIG. 3, the joint formed corresponds to a slot formed in the block-like member 5 (unnumbered) into which the slot-shaped end 6 of the member 8 is inserted and held while the portion 6 is welded (indicated by the rough filler material shown between the block-like member 5 and the portion 6) to form a solid, leak-proof joint that fixedly retains the slot-like member 6 and the member 5 together.

The member 6 is slot-like in shape, and has an area in cross-section approximately equal to that of the inlet area at the inlet 11. Although the member 6 is shown as being welded to the member 5, any known manner of connection is contemplated, and any manner of connection known to anyone of skill in the machining or metal working arts, is contemplated as being within the scope of the present invention. For example, the entire assembly from the inlet portion 11, including conduit 10, the portion 8, the slot 6 and the block-like member 5 could be formed in a single molded cavity including the appropriate internal preforms to cause the final shape to occur. Such a well-known method is the "lost wax" method of forming intricately shaped objects. Other methods are also known, such as forming by sections through a molding process, and then attaching the parts at a later stage, and all such methods are contemplated as being within the scope of the present invention.

FIG. 4 is a side elevational view of the block-like member 3 as seen separated from the other block-like members 2 and 5. In this figure, the gasket 14 is shown as being attached, as by glue, frictioned attachment, or ordinary low-strength adhesion, to the block-member 3. Here, in dotted outline is seen the bore 31 extending completely through the block-like member 3. Also seen in dotted outline is the value body 45 which is rigidly and fixedly connected to the headed member 4 and the nut member 41. As seen in FIG. 4, a washer member 4 exists between the nut 41 and the block-member 3. No other bores are formed in the block-like member 3 except as seen in FIG. 5, bores 31 and 32, discussed hereunder.

Figure 5:
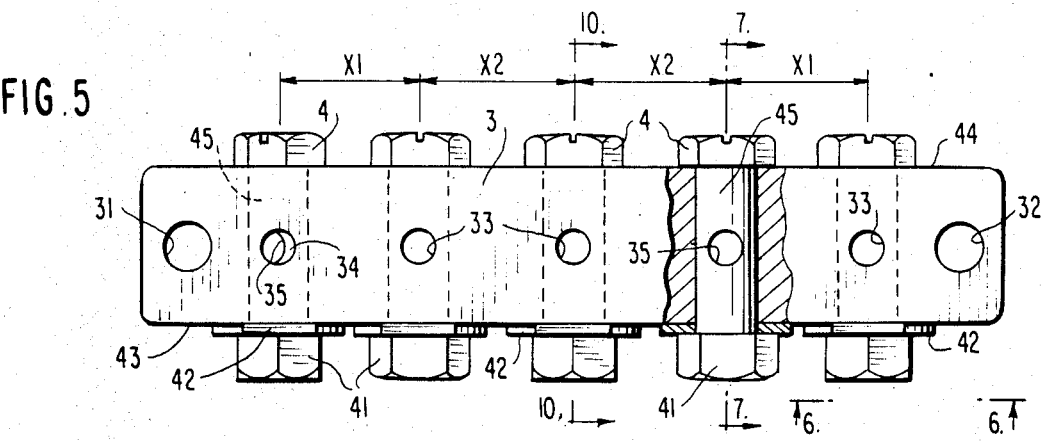
FIG. 5 is a front elevational view of the second block-like member, partially broken away to reveal the plug valve body details.

FIG. 5 is a front elevational view of the block-like member 3 as it would be seen from the right in FIG. 1 and in true elevational view as seen from the right in FIG. 2. It is shown separated from the other components as it would be prior to assembly, or while it would be removed for cleaning, refurbishing, or the like. FIG. 5 shows the surface of the block 3 partially broken away, to show the plug valve body 45 having a hole 35 bored therethrough. The hole 35 bored therethrough corresponds approximately identically to the shape and size, as well as the location, of bores 33 bored completely straight through the block-like member 3. Thus, the operation of the plug valves 4 is readily apparent from FIG. 5. When completely aligned, as are the right-hand-most four of the five shown valve members, the bores 33 and the bores 35 exactly coincide to permit full flow of paste therethrough. However, as seen in the left-hand-most valve 4, when the valve is turned slightly clockwise as seen from the top of the FIG. 5, the bores 33 and 35 misalign, so that a portion of the valve body 34 obstructs the passageway 33. Such obstruction not only limits the flow through the bores 33, but also imparts a directionality to the flow, which directionality is transverse to a central bore axis of the bores. Thus, by suitable rotation either clockwise or anticlockwise of the valves 4, a predetermined directed transverse component of the exiting paste can be caused to exit between the block-like member 3 and the axis of the nozzles 19. This permits precisely aligned and precisely spaced rows of extrudate to be applied upon a substrate. Such would not occur if nozzles were used in conjunction with gate valve members, or any other type of valve member which cannot control both flow and directionality of the transverse component of flow relative to the axis of the nozzles.

Furthermore, due to the end effects of the slot 6 to prevent "starving" of one or more of the nozzles 19, each of the valves 4 may be required to adjusted somewhat differently so that each of the nozzles 19 extrudes approximately the same amount of extrudate paste as do each of the other nozzles 19. This is very important from the standpoint of product quality and product uniformity, since the end products are formed from the substrate upon which the extrudate lies. The substrate being, in the preferred embodiment, shredded wheat, upon which a second set of layers of shredded wheat is added with the resultant assembly of layers being pinched, toasted, and cut or broken along pinched regions to form shredded wheat biscuits, product uniformity is essential to prevent exposure of the paste (such as raisin paste or apple paste, for example, among others) along the ends or edges of the finished product, where the paste might tend to dry. A biscuit so formed also has a more attractive appearance where very little or no paste is visible along the edges.

As seen in FIG. 5, the washers 42 are adjacent a lower surface 43 of the block-like member 3. The bores 31 and 32 are to permit passage of the headed fasteners 28 therethrough, and the bores 31 and 32 are not threaded. The block-like member 3 has an upper surface 44, and a spacing between the center line of each of the bores 33 is indicated by the indicia "X1" or "X2". In the present preferred embodiment, the magnitude of X1 is less than the magnitude of the value of X2. This shows the compensation required due to the "end" effects between the relative nozzle spacings in order to achieve uniform and precisely controllable, extrudate spacing. The present arrangement shown achieves five approximately equal spaced extrudate rows; if the nozzles themselves were equally spaced, the rows of extrudate would not be equally spaced due to the end effects discussed above. If the nozzles were equally spaced, the outermost extrudate row on either side would have a greater spacing than the central rows, due to the above-mentioned end effects.

While five nozzles are shown and described hereinabove, producing five continuous rows of extrudate, the present invention is not limited thereto. Use of two nozzles to any desired number of nozzles is contemplated as being within the scope of the present invention. For example, the present apparatus could include 9, 20, or any other desired number of nozzles. The preferred embodiment, having five nozzles, is exemplary of the problems encountered and solved by the present invention. In particular, the spacing of the outermost nozzles at each end is a problem solved and discussed hereinabove, and such solution, namely reducing the spacing of each outermost nozzle, is readily applicable to nozzle systems of four or more nozzles. Also, control of paste flow rate and direction as described hereinabove is applicable to a system having any number of nozzles.

FIG. 6 is a bottom elevational view of one of the nuts 41 and the lower surface 43 of FIG. 5. The remainder is broken away, since each of the nuts is shown in typical view. As seen, indents 46 are formed in the lower nut surface and the lower valve body portion 45, the nut 41 being joined to the valve stem 45 by a series of indents 46, welds 46, or the like, and which nut 41 and stem 45 may be crimped, welded, or glued together to retain the stem 45 rotatably in the block-like member 3. Otherwise, vibration or other forces could tend to force or allow the stem 45 to drift out of the block-like member 3 vertically in the direction of the head 4, away from the upper surface 44. Also, the shape of the washers 42 is clearly shown as being that of a generally truncated circular body in FIG. 6.

FIG. 7 is a side elevational view of the valve body, having a stem 45 and showing a cross-sectional view of the nut 41 including the points of attachment 46 between the stem 45 using the nut 41. FIG. 7 shows the cylindrical aspect of the stem 45 in the shade lines, and shows in dotted outline the bore 35 formed therethrough. The member 3 is seen in cross-section in this figure. The bore 35 itself is seen more clearly in FIG. 10, discussed hereunder.

FIG. 8 is a front elevational view of the block-like member 2, showing the nozzles 19 as they would be seen in front view taken from the right of FIGS. 1 and 2, and shown as disassembled as the block-like member 2 would be prior to assembly, or during a cleaning operation or refurbishing operation.

The surface 29 is visible in true aspect in FIG. 8. Bores 27 are visible at either end of the block-like member 2, which bores are unthreaded to permit ready passage of the fastener members 28 (seen in FIGS. 1 and 2)

therethrough. Also, the distances between center lines of the nozzles 19 are indicated by the respective indicia "X subscript 1" and "$X_2$". $X_2$ is greater than $X_1$ by a predetermined amount sufficient to account for end effects, directionality of flow through the nozzle which is not exactly parallel to the central axis of the nozzles, as discussed hereinabove. The block-like member 2 has an upper surface 283 and the nozzles 19 are seen as tapering to a sharply defined central bore.

FIG. 9 shows in dotted outline, through the block-like member 2, the internal bore receiving the member 203, the internal bore being threaded and unnumbered in FIG. 9. The internal thickness of the threaded portion 203 is indicated by the dotted lines 27, the thickness being relatively small to allow passage of paste from the opening in the gasket 13 and block-like member 2 into the threaded end 203 and thence to the nozzle 19.

In FIG. 9, the hexagonal nut portion 202 is adjacent to the threaded portion 203, and permits rotational adjustment of the spacing of the nozzle 19 from the surface 29 of the block-like member 2. A cylindrical portion 201 is adjacent the nut 202, and a smoothly tapering ledge 200 connects the nozzle 19 to the cylindrical member 201.

FIG. 10 is a view of the plug valve member 4 as seen in FIG. 5, but being partially broken away to expose the inner bore 35. The nut 41 is also shown in section, while the upper portion of the valve stem 45 is shown in elevational view at a location just above the bore 35. The block-like member 3 is shown in section also.

FIG. 11 is a sectional view of the member 8 as taken along line 11—11 of FIG. 2. This shows an exaggerated thickness of the hollow member 8, and also shows the general curvature of the member 8 at the location of the view 11—11.

FIG. 12 is a rear elevational view of the block-like member 2 as seen from the rear of FIG. 8. Here, the bores 27, 27, which are unthreaded, are visible. The bores 27 receive the attaching members 28 as seen in FIGS. 1 and 2. Also, the gasket 13 is visible in FIG. 12, having bores 25 visible therethrough. As seen in FIG. 12, a tapering portion just adjacent the nozzle end terminates at a circular nozzle outlet 19.

FIG. 13 is a side sectional view taken along line 13—13 of FIG. 12, and shows the internal shape of the nozzles 19, and their location in the block-like member 2. The nozzle 19 and the block-like member 2, as well s the gasket 13, are all shown in sectional view. Also, the internal threading of the bore 25 is clearly seen in FIG. 13.

As seen in FIG. 13, the internal bore (unnumbered) of the nozzle 19 tapers from a relatively large cross-sectional area to a more constricted cross-sectional area at the nozzle outlet. The nozzle outlet is relatively very sharp, to prevent clogging or sticking of the paste material to the external edges of the nozzles 19. The threaded portion 203 is shown as being only partially inserted into the bore 25, leaving room for adjustment by rotation of the nut 202 to insert the threaded portion 203 further into the bore 25, or to retract it from the bore 25.

Figure 14:
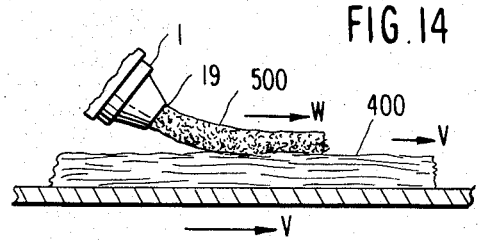
FIG. 14 is a side elevational view of a moving belt having a bed of shredded wheat thereon, with a portion of the nozzle of the present invention extruding paste onto the moving bed of shredded wheat.

FIG. 14 is a side elevation view of the paste extruder 1 in operation. Here, a single row of extrudate 500, broken away at its leading edge to indicate that the extrudate 500 extends indefinitely, travels at a velocity W as indicated by the arrow in FIG. 4.

The nozzle 19 is oriented downwardly and directly above a bed of shredded wheat 400. The bed 400 is comprised in the preferred embodiment of four layers of shredded wheat, sufficient to form one-half of a shredded wheat biscuit. The bed 400 is broken away along its leading and trailing edges to show that it also extends indefinitely in either direction. The shredded wheat bed travels together with a conveyor belt directly beneath it (unnumbered in FIG. 14) at a velocity V.

Figure 15:
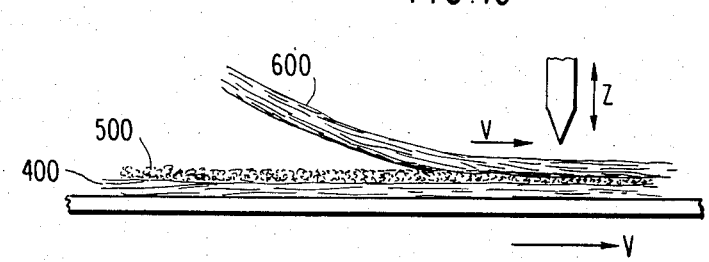
FIG. 15 is a side elevational view of the moving bed of shredded wheat on the conveyor belt having a continuous line of paste thereon, with a second layer of shredded wheat being layed atop the lower bed of shredded wheat and the rows of paste, with a pincher schematically representing the pinching and cutting operations which latter take place to form a completed biscuit.

FIG. 15 shows a second and third stage of the operation, wherein a second layer of shredded wheat 600 is laid atop the moving bed 400 and atop the extrudate row 500. In the present invention, there would be at least 5 rows of extrudate 500 across a relatively wide bed 400 of shredded wheat. The layer 600 in the preferred embodiment is comprised of four layers of shredded wheat, sufficient to form the upper half of a shredded wheat biscuit.

The layer 600 is laid so that it travels also at a velocity V which is approximately indentical to that of the conveyor belt and the bed 400.

A pinching member is symbolically indicated in FIG. 15, and travels with a vertical velocity component Z as indicated by the double-headed arrow of the figure. The pinching and cutting operations needed to form individual shredded wheat biscuits are well-known and conventional in the art, and commonly include a pair of pincher members to form each pair of sealed edges which are on opposed sides of each shredded wheat biscuit, as well as a longitudinal pincher which in the preferred embodiment pinches the shredded wheat at locations between the rows of extrudate 500.

Figure 16:
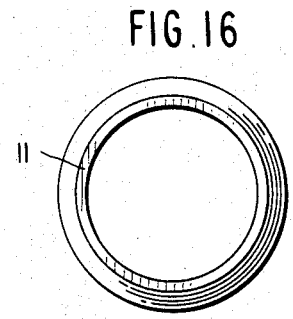
FIG. 16 is a side elevational view of the apparatus inlet of FIG. 1, taken from the left of FIG. 1.

FIG. 16 is a side elevational view of the inlet portion 11 taken from the left-hand side of FIG. 1. It shows the generally circular cross-sectional outline of the inlet 11.

Figure 17:
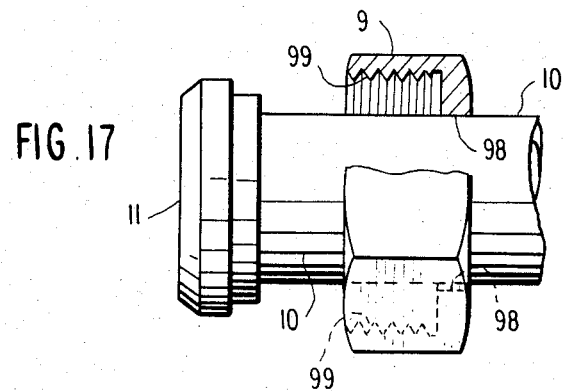
FIG. 17 is an enlarged elevational view of the nut portion for connecting the apparatus inlet portion to a conventional pipe.

FIG. 17 is an enlarged elevational view of the inlet portion seen in FIG. 1, but showing the internal structure of the nut 9. The nut 9 has a threaded portion 99 which is adapted to slide over the largest portion of the inlet end 11 so as to couple with a threaded pipe end. Also, the inner ledge 98 is formed which slides on the conduit 10, a transverse portion of that ledge (unnumbered in FIG. 17) abutting one of the projections of the inlet 11 which projects beyond the conduit 10, thereby enabling the nut 9 to engage both a portion of the inlet 11 as well as to engage a paste supply conduit (not shown in any of the figures) having a threaded end.

Figure 18:
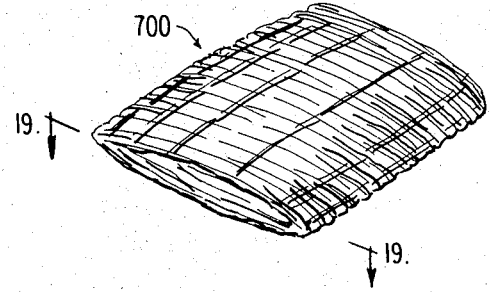
FIG. 18 is a perspective view of a shredded wheat biscuit formed either according to the present invention or to any well-known process of forming shredded wheat biscuits.

FIG. 18 is a perspective view of a shredded wheat biscuit 700 formed according to the present invention. A completely conventional biscuit shape has right and left-hand pinched ends and front and rear pinched ends, so as to form the conventional "pillow" shape of the shredded wheat biscuit. FIG. 18 shows a biscuit having one "open" end, unpinched, along the lower left-hand biscuit edge. This end can be pinched or not, as desired, to form a conventional biscuit shape.

Figure 19:
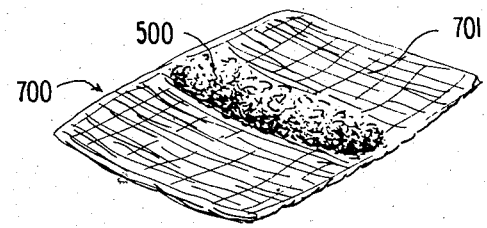
FIG. 19 is a view taken along line 19—19 of FIG. 18, showing the disposition of the paste extrudate relative to the finished shredded wheat biscuit product.

FIG. 19 shows the lower half of a shredded wheat biscuit taken along line 19—19 of FIG. 18.

As seen in FIG. 19, the biscuit 700 has an internal 701 representing the original top of the lower bed 400, and the row of extrudate 500 is aligned generally centrally between the upper and lower cut edges as seen in FIG. 19 (the apparent nearer and farer edges) so that the paste 500 is not generally visible from the cut ends of the shredded wheat biscuit. However, the extrudate 500 runs continuously across the pinched ends, and therefore it is possible that small amounts of the extrudate 500 might be visible at the locations where by the shredded wheat biscuits are pinched together (the left and right-hand portions of the biscuit shown in FIG. 19). However, usually the pinching operation itself forces the extrudate slightly inwardly along the pinched edges, and the shredded wheat fibers pinched together generally do not show significant evidence of the extrudate therein. Some evidence is more visible on some biscuits than others. This pinching additionally helps to preserve the moistness and softness of the extrudate 500 by serving as a moisture barrier.

As discussed hereinabove, the extrudate paste 500 can be any type of raisin paste, apple paste, or the like. While consistency of the paste is important, nonetheless the paste need not be composed of only extremely minute particles, but may include slightly larger particles visible to the human eye, as well. This is especially true in the case of raisin paste, where the skins of the raisins are difficult to completely grind into fine pieces. Generally, however, the finer division of particles is especially desirable for the extruding operation itself.

The paste of the present invention, formed from raisins or apples, or other fruits, or other edible foods which can be formed into a paste, may also include a stabilizing agent to retain the moistness of the paste. Such stabilizing agents are well-known in the art, and may include oil-based stabilizers as well as water-based stabilizers. Such stabilizers may also include algin-type stabilizers as well as any other known fruit stabilizers useful in the present invention.

The present invention is capable of achieving all of the above-enumerated objects, and while a preferred embodiment has been set forth, the scope of the present invention is not limited thereto but may be embodied within the scope of the following claims.

What is claimed is:

1. An apparatus for depositing rows of paste, comprising:
    a paste conduit portion;
    a paste outlet portion connected to said paste conduit portion;
    said outlet portion including a plurality of outlet orifices, each comprising a nozzle member fixedly connected to a third block-like member, each said nozzle member being adjustable in spaced relation to said third block-like member;
    means for controlling and directing the flow of paste to each of said outlet orifices comprising a plug valve having a headed portion adapted to be rotated to control the relative position of the plug valve body in relation to a retaining block-like member that retains the plug valve body in alignment with an orifice through said retaining block-like member;
    each said nozzle member having a relatively sharp edge to prevent clogging of outer portions of said nozzle member during extrusion of the paste;
    said paste conduit portion having a first end of a generally circular cross-sectional shape, and a second end having a generally slit-like cross-sectional shape, said paste conduit portion gradually changing in cross-sectional shape from said first end to said second end, and said second end being fixed to a first block-like member;
    said first block-like member being fixedly connected to said retaining block-like member whereby paste flow is supplied from said conduit to each of said nozzle members;
    said retaining block-like member being fixedly connected to said third block-like member;
    each of said nozzle members being received in bores extending through the entire width of said third block-like member;
    said bores being in alignment with bores formed completely through said retaining block-like member;
    said plug valve members having bores extending through the plug valve body, said plug valve bores being aligned with each respective one of said bores extending through said retaining block-like member;
    whereby rotation of said plug valve headed portion causes simultaneously at least a partial obstruction or opening of the paste flow area through said retaning block-like member as well as imparting a component of motion to the paste flow that is generally transversely directed to a central axis of each said nozzle member.

2. An apparatus as claimed in claim 1, further comprising nut members retaining an extension portion of said plug valve members against an underside of said retaining block-like member;
    whereby axial sliding of the plug valve members is prevented.

3. The apparatus as claimed in claim 1, further comprising a generally hollow cylindrical conduit member fixedly attached to said paste conduit member, said cylindrical conduit member having a slidable nut thereon adapted to attach said cylindrical member to a threaded cylindrical supply conduit;
    whereby paste can be supplied to said cylindrical conduit.

4. An apparatus as claimed in claim 2, wherein a gasket is interposed between said first block-like member and said retaining member;
    whereby fluid leakage is prevented between said members by said gasket.

5. An apparatus as claimed in claim 2, wherein a gasket is interposed between said retaining block-like member and said third block-like member, to prevent fluid leakage between said members.

6. An apparatus as claimed in claim 1, wherein the paste is raisin paste.

7. An apparatus as claimed in claim 1, wherein the paste is apple paste.

8. An apparatus as claimed in claim 1, wherein said paste is any edible paste.

9. An apparatus as claimed in claim 1, wherein said paste is strawberry paste.

10. An apparatus as claimed in claim 1, wherein said paste is apricot paste.

11. An apparatus as claimed in claim 1, wherein said paste is blueberry paste.

12. An apparatus as claimed in claim 1, wherein said paste is banana paste.

13. An apparatus as claimed in claim 1, wherein there are five said nozzle members.

14. An apparatus as claimed in claim 1, wherein there are at least two said nozzle members.

15. An apparatus for depositing rows of paste, comprising:
    (a) a paste conduit portion;
    (b) a block-like member having first and second ends, wherein said first end is fixedly attached to said paste conduit portion, wherein said block-like member has a first plurality of through-bores for directing flow of paste between said first and second ends, each of said through-bores having an inlet orifice on said first end and an outlet orifice on said second end, wherein said block-like member is further provided with a second plurality of bores adapted to receive flow control means, each of said second plurality of bores extending transversely through one of said through-bores for directing flow of paste, and wherein each of said outlet orifices is mutually spaced to provide rows of equally spaced extrudate upon a moving conveyor located below said outlet orifices;

(c) flow control means located in each of said second plurality of bores, wherein said flow control means is a rotatable plug valve having an alignable bore extending therethrough, said alignable bore being alignable with one of said through-bores for directing flow of paste, whereby an apparatus is provided for simultaneously depositing a plurality of equally spaced uniform rows of paste.

* * * * *